United States Patent
Ozluturk

(10) Patent No.: US 7,580,729 B2
(45) Date of Patent: *Aug. 25, 2009

(54) METHOD AND SYSTEM FOR UTILIZING SMART ANTENNAS IN ESTABLISHING A BACKHAUL NETWORK

(75) Inventor: Fatih M. Ozluturk, Port Washington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 298 days.

This patent is subject to a terminal disclaimer.

(21) Appl. No.: 11/648,234

(22) Filed: Dec. 29, 2006

(65) Prior Publication Data

US 2008/0057871 A1   Mar. 6, 2008

Related U.S. Application Data

(63) Continuation of application No. 11/015,557, filed on Dec. 17, 2004, now Pat. No. 7,158,814.

(60) Provisional application No. 60/578,677, filed on Jun. 10, 2004.

(51) Int. Cl.
*H04M 1/00* (2006.01)
*H04Q 7/20* (2006.01)

(52) U.S. Cl. .................... 455/562.1; 455/63.4; 455/445

(58) Field of Classification Search ................ 455/63.4, 455/67.11, 445–449, 562.1; 342/368, 371–374; 370/328, 334, 351

See application file for complete search history.

(56) References Cited

U.S. PATENT DOCUMENTS

| 5,767,807 | A | 6/1998 | Pritchett |
| 6,252,548 | B1 | 6/2001 | Jeon |
| 6,850,502 | B1 * | 2/2005 | Kagan et al. ................. 370/330 |
| 7,130,365 | B2 | 10/2006 | Li |
| 7,158,814 | B2 * | 1/2007 | Ozluturk .................. 455/562.1 |
| 2003/0087674 | A1 | 5/2003 | Li et al. |
| 2003/0109285 | A1 | 6/2003 | Reed et al. |
| 2003/0152086 | A1 | 8/2003 | El Batt |
| 2005/0094585 | A1 | 5/2005 | Golden et al. |
| 2006/0071853 | A1 | 4/2006 | Sayers |

* cited by examiner

*Primary Examiner*—Lee Nguyen
(74) *Attorney, Agent, or Firm*—Volpe and Koenig, PC

(57) ABSTRACT

A method and system for utilizing smart antenna in transmission of messages between nodes are disclosed. A wireless communication system includes a plurality of nodes, and each node is capable of being connected to each other node. At least a portion of the nodes are provided with a smart antenna configured to generate a plurality of directional beams. Each node maintains a list of other nodes and beam configuration information to be used in transmission of messages to other nodes. When a source node is required to transmit to a target node, the source node retrieves the beam configuration information and transmits with a directional beam directed to the target node.

19 Claims, 2 Drawing Sheets

METHOD AND SYSTEM FOR UTILIZING SMART ANTENNAS IN ESTABLISHING A BACKHAUL NETWORK

CROSS REFERENCE TO RELATED APPLICATIONS

This application is a continuation of U.S. patent application Ser. No. 11/015,557, filed Dec. 17, 2004, which claims priority from U.S. Provisional Application No. 60/578,677 filed Jun. 10, 2004, which is incorporated by reference as if fully set forth.

FIELD OF INVENTION

The present invention is related to wireless communications. More particularly, the present invention is a method and system which utilizes smart antennas in establishing a backhaul network.

BACKGROUND

One of the most important issues in a wireless communication system is to increase of capacity of the system by decreasing interference. Array antennas (also known as smart antennas) have been developed to improve capacity and to reduce interference. A smart antenna uses a plurality of antenna elements to generate a directional beam radiating signals only toward a particular direction in azimuth, and selectively detects signals transmitted from a particular direction. With a smart antenna, a wireless communication system is able to increase capacity and reduce interference since signals are radiated to a narrow region in a coverage area. This increases overall system capacity since a transmitter may increase the transmission power level of the directional beam without causing excessive interference to other transmitters and receivers, such as wireless transmit/receive units (WTRUs) and base stations.

A wireless communication system generally comprises a plurality of nodes, such as base stations and radio network controllers, or the like. The nodes are typically connected to each other with wired connections, such as a mesh network or a cellular network. The nodes communicate with each other and transmit messages, such as backhaul messages.

However, there is a disadvantage with wired connections for establishing a backhaul network in that wired connections are expensive, time consuming, and inflexible for modification or change of the network. In particular, mesh networking requires nodes to be connected with each other. When a new node is added to the mesh network, there is a large burden (in terms of both cost and time) for establishing new connections to the new node for backhauling.

Therefore, there is a need for a cost effective, less time consuming, and flexible method and system for establishing a backhaul network.

SUMMARY

The present invention is a method and system for utilizing a smart antenna in establishing a backhaul network. The present invention is directed to using smart antennas in for improving in-cell communications, increasing throughput and forming at least a portion of a flexible backhaul network for conveying backhaul data. The present invention is implemented in a wireless communication system which includes a plurality of nodes, and wherein each node is connected together in a mesh network. At least a portion of the nodes are provided with one or more smart antennas which are configured to generate a plurality of directional beams. Each node having one or more smart antennas maintains a list of other nodes having smart antennas and beam direction and configuration information to be used in transmission of messages to those other nodes. When a source node is required to transmit backhaul data to a target node, the source node retrieves the beam direction and configuration information for the target node and transmits the messages with a directional beam directed to the target node.

DETAILED DESCRIPTION OF THE PREFERRED EMBODIMENTS

The present invention is applicable to any wireless communication system including, but not limited to, Time Division Duplex (TDD), Frequency Division Duplex (FDD), and Time Division Synchronous Code Division Multiple Access (TD-SCDMA), as applied to a Universal Mobile Telecommunications System (UMTS), CDMA2000, CDMA in general, Global System For Mobile Communications (GSM), General Packet Radio System (GPRS), and Enhanced Data Rates For GSM Evolution (EDGE).

Hereafter, the terminology "WTRU" includes but is not limited to a user equipment, a mobile station, a fixed or mobile subscriber unit, a pager, or any other type of device capable of operating in a wireless environment. When referred to hereafter, the terminology "node" includes but is not limited to a base station, a Node-B, a site controller, an access point or any other type of interfacing device in a wireless environment.

Figure 1:
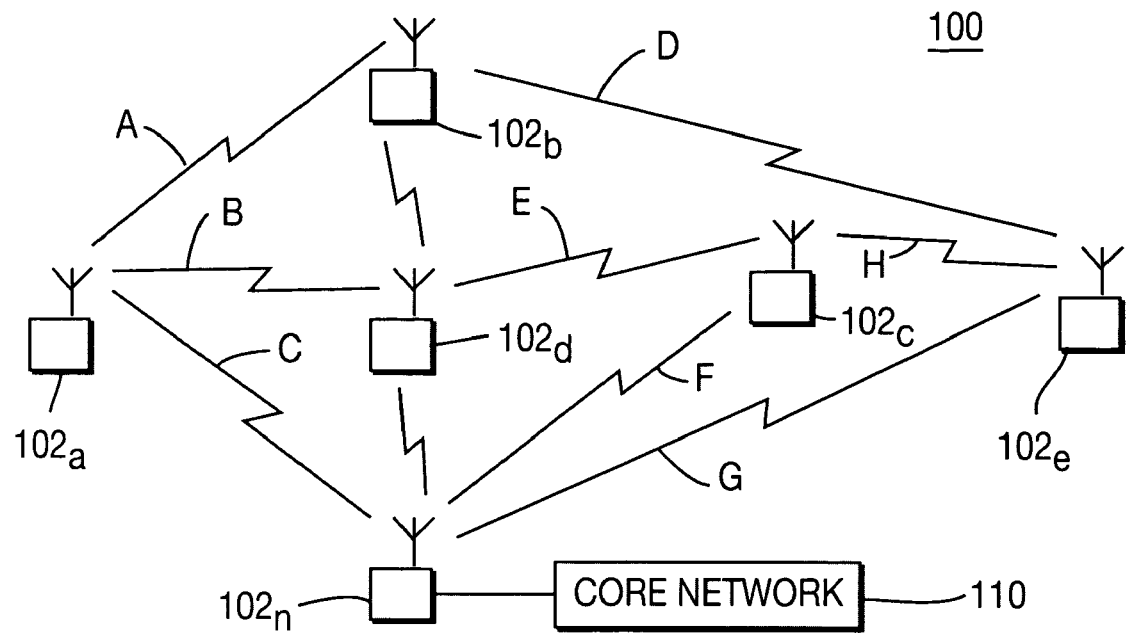
FIG. 1 is a block diagram of a network of a plurality of nodes in accordance with the present invention.

FIG. 1 is a block diagram of a network 100 of a plurality of nodes 102a-n in accordance with the present invention. At least one of the nodes, graphically shown as 102n, is connected to a core network 110. The operation of a core network of a wireless communication system is well known to those of skill in the art and is not central to the present invention. Accordingly, the core network 110 will not be explained in detail herein.

Each node 102a-n serves one or more WTRUs (not shown) which are located within the coverage area of the nodes 102a-n. The network 100 may be a mesh network or a cellular network. In the context of the present invention, both mesh networks and cellular networks transmit backhaul information, but there is a fundamental difference. Cellular networks typically have fixed network infrastructures and backhaul connections. These connections are typically point-to-point and they do not change. One node transmits the backhaul data to another node at another location in the network, and to that location only.

In the case of a mesh network, the connections between nodes change, and therefore the backhaul data may be transmitted to different nodes at different times for further routing. Particularly in the case of mesh networks, since the backhaul connection can change from time to time, it is important to be able to adjust the smart antennas so that a connection to a different node can be achieved without creating undue interference to other nodes.

At least a portion of the nodes 102a-n are provided with at least one smart antenna (as will be explained in detail hereinafter) and utilize the smart antenna in transmission of backhaul data to other nodes 102a-n in addition to regular download transmissions to WTRUs and upload receipts from WTRUs. These nodes 102a-n are capable of generating a plurality of directional beams and steering the beams to any direction in azimuth.

It is expected that the network 100 will include nodes with wired connections as well as those with wireless backhaul connections that use smart antennas. Since connections established using smart antennas can be reconfigured and directed to different nodes, they increase the flexibility of the system. However, at least one of the nodes will have both a wired connection to the core network 110 and wireless connections to other nodes in order to provide a connection between the group of wireless nodes and the core network that is essentially wired. At least a portion of the nodes 102a-n may also be provided with the capability to transmit backhaul information over a wired or dedicated connection. A node (shown as node 102n) having both wired and wireless backhaul connections, (hereinafter referred to as a hybrid node), will be the connection to the wired core network 110. In other words, as nodes transmit backhaul information wirelessly with the help of smart antennas, this backhaul information will be routed eventually to the core network 110 through the hybrid node 102n. Therefore, the hybrid node 102n can receive and send backhaul information to the nodes with wireless backhaul connections while it receives and sends backhaul information to the core network 110, thereby forming a bridge.

Figure 4:
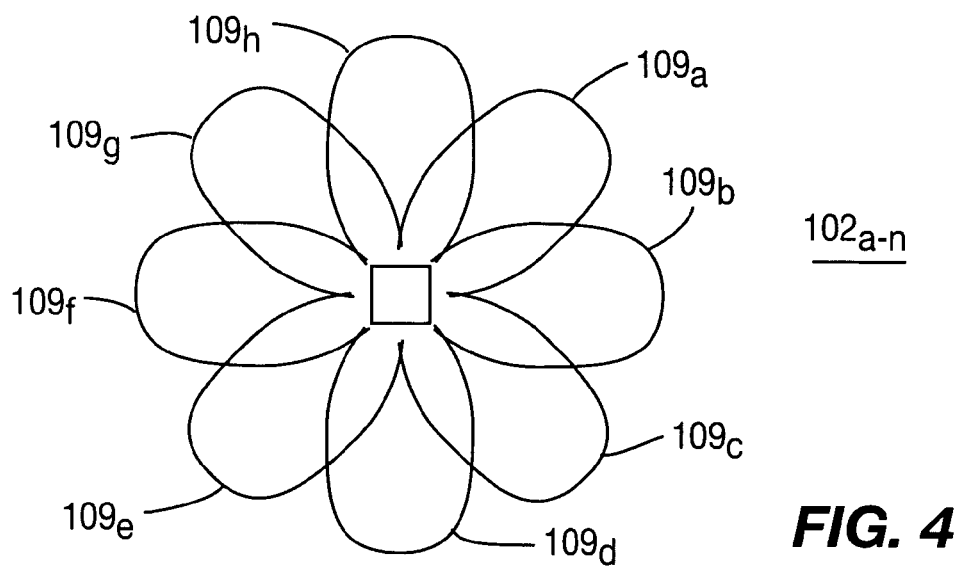
FIG. 4 is a diagram of an example of a beam pattern generated by a node in accordance with the present invention.

In one embodiment, a node 102a-n has a plurality of predetermined beams 109a-h as shown in FIG. 4, and selects one among the plurality of beams 109a-h in order to direct a transmission or reception. FIG. 4 shows eight beams in azimuth that may be generated by each node 102a-n. It should be noted that the beams shown in FIG. 4 are provided just as an example and any number of beams, beam patterns, or any other type of pattern may be implemented.

In an alternative embodiment, each beam 109a-h may be generated and directed in real time, rather than chosen from a set of predetermined positions.

A node 102a-n selects a beam 109a-h direction, either dynamically or among a plurality of available positions, that provides the best performance in terms of system capacity, data throughput, interference, or the like. Nodes 102a-n are generally fixed in a particular location. Therefore, once a beam 109a-h and configuration between two nodes 102a-n is set, the direction and configuration may be stored and used thereafter without change. Each node 102a-n may be capable of providing more than one beam 109a-h for connection to other nodes 102a-n, since the radio environment and the traffic load may change on a long-term basis. Therefore, each node 102a-n monitors signals received from other nodes 102a-n in order to determine the radio environment, and dynamically adjusts the beam direction and signal configuration to optimize the performance of the system.

One example of the operation of the system is as follows: a first selected node, such as node 102a, generates a beam and steers it towards another selected node, such as node 102b. This can be done by adjusting the complex weights applied to the antenna array elements as is typically done with beam forming antenna arrays. At the same time, node 102a measures the quality of the link A to node 102b. The quality of the link A may be measured as signal-to-noise ratio, bit or frame error rate, or some other measurable quality indicator. The transmitting node 102a finds the best antenna beam direction, the best combination of weights to maximize the link quality in this case, and stores both the link quality measure and the corresponding beam direction (weights). The transmitting node 102a does this for all nodes that are in the vicinity and stores the corresponding quality and beam information.

Any node 102a-n can be flexibly and wirelessly connected or disconnected to other nodes 102 a-n by selectively directing one or more beams at the other nodes 102a-n. In FIG. 1, the first node 102a transmits messages to the second node 102b using a directional beam A, and to a fourth node 102d using a directional beam B. The directional beams A and B are independently controlled and can be transmitted simultaneously. Since each directional beam A and B is radiated only toward a particular direction, it does not cause excessive interference to other nodes 102a-n or WTRUs.

Figure 2:
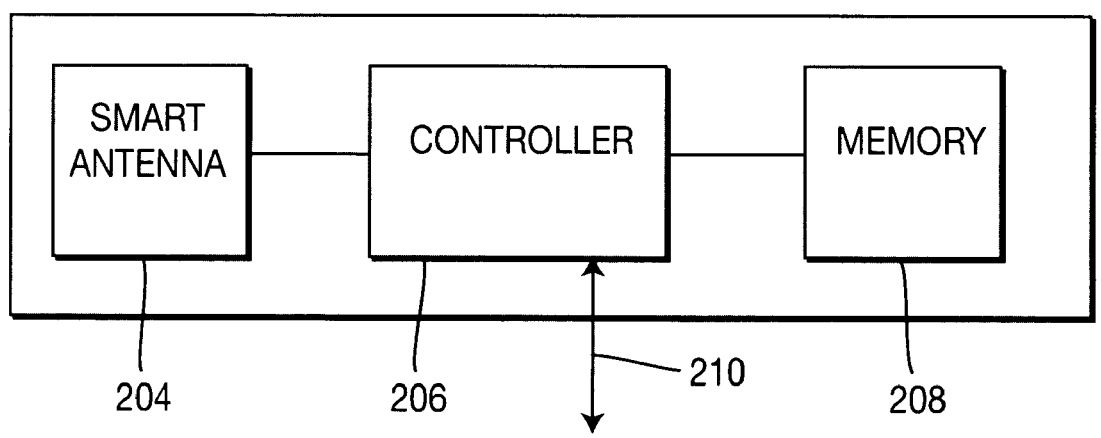
FIG. 2 is a block diagram of a node made in accordance with the present invention.

FIG. 2 is a block diagram of a node 202 in accordance with the present invention. The node 202 comprises a smart antenna 204, a controller 206, a memory 208 and an optional wired link 210. The wired link 210 may be a link to the core network 110 or to another node. The node 202 implements a signal processing algorithm to adapt to user movement, changes in the radio-frequency environment and multipath along with co-channel interference. A radio resource management (RRM) function implemented by the controller 206 decides how radio resources should be allocated in the node 202.

The smart antenna 204 comprises a plurality of antenna elements (not shown) to generate a plurality of directional beams under the control of the controller 206. Each beam functions as a wireless connection between the node 202 and other nodes. As aforementioned, since the node 202 is typically fixed in a particular location, a beam direction and configuration between two nodes can be predetermined and stored in the memory 208. The memory 208 maintains a list of other nodes and beam direction and configuration information for each of those other nodes. When the node 202 is required to transmit messages, such as backhaul data, to another node, the controller 206 retrieves corresponding beam direction and configuration information from the memory 208 and generates a directional beam steered to a particular direction and transmits the messages using the beam.

In the case of a hybrid node 102n, this process is followed in establishing wireless connections to other nodes with the help of the smart antenna 204. When the hybrid node 102n establishes a backhaul connection to the core network 110, or another node, there is no configuration information or no beam selection since the wired link 210 is physically fixed and will always provide a connection between the same two nodes.

In accordance with the present invention, the smart antenna 204 preferably has a multi-beam capability, in which each beam can be used independently. A node 202 generates more than one directional beam to transmit backhaul data to a plurality of other nodes at the same time. Since the same frequency may be reused for more than one directional beam in the same coverage area, the system capacity is substantially increased.

Several nodes may be coupled together with several beams. This makes it convenient to change connections and dynamically adapt to changes in the radio environment. For example, two beams may be provided for connection between two nodes. If one beam suffers from excessive interference, then the nodes may switch to another beam for transmission of messages.

The use of smart antennas enables the formation of flexible backhaul links between nodes. Since each node is configured to generate a plurality of directional beams and is capable of steering the directional beams to any direction in azimuth, when a new node is added to the network 100, existing nodes may establish new connections to the new node by simply setting a new beam direction and configuration directed to the new node. In addition, when an existing node is removed from the network 100, nodes may simply delete beam direction and configuration information for the removed node from memory 208. The present invention makes additional installation or removal of facilities unnecessary for establishing or removing connections between nodes. It should be noted that the present invention may be implemented either in a mesh network or in a cellular network.

One of the strengths of mesh networking is the ability to create new links and delete other links between nodes depending on a plurality of factors, including a traffic load, interference, and individual node performance. As shown in FIG. 1, a plurality of nodes 102a-n are coupled to each other using smart antennas. The lines between the nodes 102a-n in FIG. 1 indicate possible links A-F. Control may be centralized, whereby at least one node functions as a controlling node to control the connection between nodes, or may be decentralized, where control is distributed over several nodes or all nodes. If one node is designated as a controlling node, the controlling node collects information regarding traffic conditions and performances in each node, and determines the best traffic route for transmission of messages from one node to another node.

Each node 102a-n preferably transmits one or more beacon signals in its one or more beams, which provide information useful for network operation. For example, the beacon signals may transmit current power levels, traffic levels, interference levels, and other parameters. Beacon signals may also include priority of access, security, identification, and other varying types of access control and security control information. The beacon signals are measured periodically or non-periodically, and the parameters are utilized as the basis for adjusting connections between nodes in order to find the most efficient traffic routes. Forming at least a portion of the backhaul connections wirelessly by using smart antennas in accordance with the present invention allows flexibility and reduces unnecessary cost and time for establishing and adjusting connections between nodes.

For example, as shown in FIG. 1, if the traffic load between the second node 102b and the fourth node 102d is too heavy, other nodes recognize the traffic conditions between the two nodes 102b, d by reading the beacon signals of the nodes 102b, d, as will be described in detail hereinafter. If the first node 102a desires to route traffic to the fifth node 102e, it will avoid, if possible, the second and fourth nodes 102b, d and will alternatively route traffic through the Nth node 102n.

The present invention not only has the advantage of providing a flexible, wireless mesh network, but also the backhaul information (which is typically sent via a wired line) may now be sent via the same flexible links through the smart antenna. Implementation of this type of dual-use smart antenna scheme in accordance with the present invention results in significant advantages over current wireless communication systems.

Figure 3:
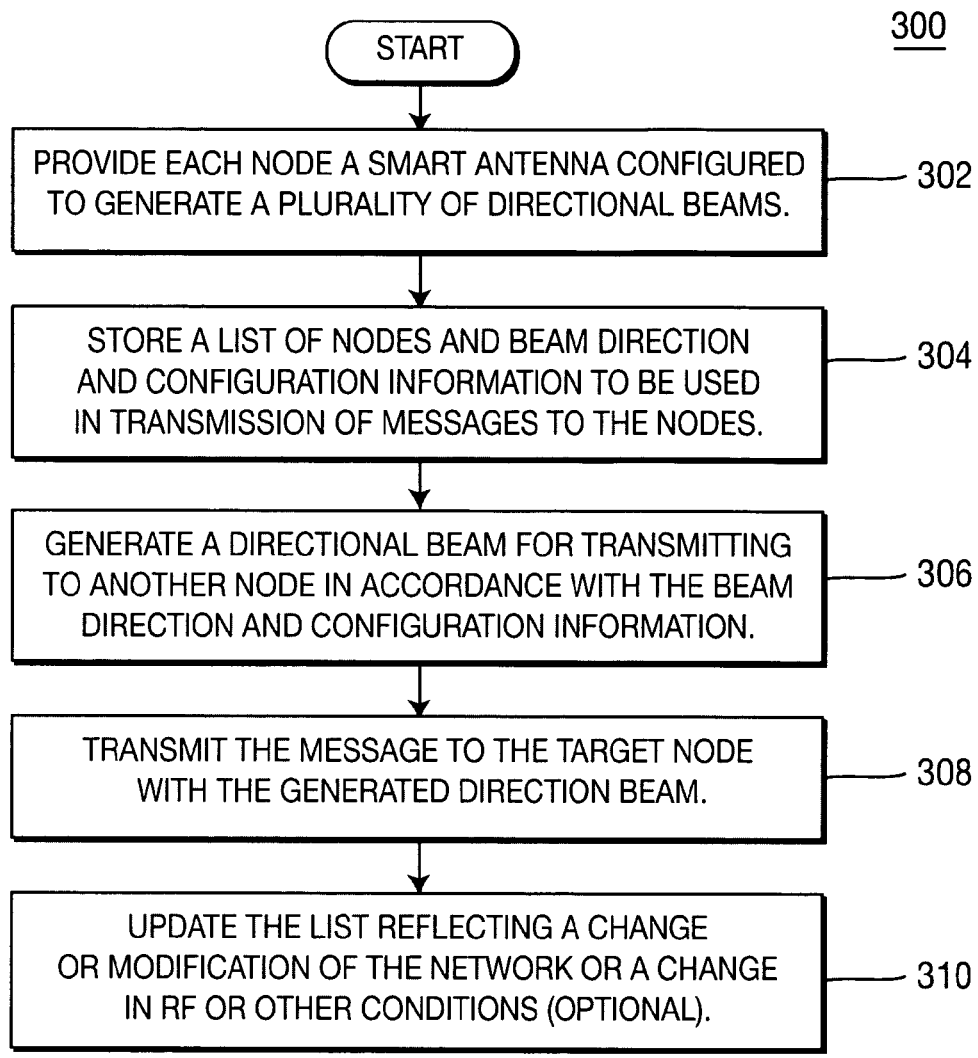
FIG. 3 is a flow diagram of a process of utilizing smart antennas in transmission of messages between nodes in accordance with the present invention.

FIG. 3 is a flow diagram of a process 300 of utilizing smart antennas in transmission of messages between nodes in accordance with the present invention. At least a portion of the nodes are provided with at least one smart antenna, which is configured to generate a plurality of directional beams and to steer then independently in azimuth (step 302). Each beam is used as a wireless connection to other nodes in addition to regular traffic of downloads to WTRUs and uploads from WTRUs. Each node maintains a list of other nodes and beam direction and configuration information to be used for transmission to the other nodes (step 304). It should be noted that steps 302 and 304 are typically performed upon setting up a system or reconfiguring the system to accept or delete nodes, and will not typically have to be formed during normal operation. When a source node is required to transmit to a target node, the source node retrieves beam direction and configuration information for the target node from the memory, and generates a directional beam using the beam direction and configuration information (step 306). Once a node is selected for transmission of backhaul data, based on link quality and other considerations such as traffic density, the transmitting node selects the beam direction (weights) from the list and applies it to the antennas.

The process for measuring the quality of links and storing relevant information may need to be done periodically since the environment may change and adjustment of beam directions may be necessary. The source node then transmits to the target node with the generated directional beam (step 308).

In an optional step, a change in the network may occur whereby a new node may be added to the network, an existing node may be removed from the network, or radio frequency or other conditions may change. In response to the change, other nodes update the list of beam direction and configuration information to reflect the change (step 310).

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless communication system for utilizing at least one smart antenna for establishing a backhaul network, the system comprising:
   a plurality of nodes, each node connected to at least one neighbor node, each node comprising:
      a smart antenna configured to generate a plurality of directional beams;
      a memory configured to store a list of neighbor nodes having connections and beam configuration information to be used in transmission of messages to the neighbor nodes; and
      a controller configured to:
         update the list stored in the memory by monitoring signals received from the neighbor nodes and determining optimum beam and signal configurations for transmitting data to the neighbor nodes and
         independently select a particular directional beam for transmitting a particular message to another node using the updated list stored in the memory,
      at least one of the plurality of nodes being a hybrid node that further comprises a wired backhaul connection to a core network.

2. The system of claim 1 wherein the hybrid node of claim 1 further comprises a wired backhaul connection to at least neighbor node.

3. The system of claim 1 wherein the generated plurality of directional beams are selected from a set of predetermined positions.

4. The system of claim 1 wherein the generated plurality of directional beams are dynamically selected and directed in real time.

5. The system of claim 1 wherein the directional beams are configured to provide the best performance in terms of system capacity, data throughput, and interference.

6. The system of claim 1 wherein at least a portion of the nodes are configured to transmit backhaul information over the wired backhaul connection.

7. The system of claim 1 wherein the hybrid node is configured to receive and transmit backhaul information to another node with a wireless backhaul connection while the hybrid node receives and transmits backhaul information to the core network.

8. The system of claim 1 wherein the plurality of nodes comprise a mesh network.

9. The system of claim 1 wherein the plurality of nodes comprise a cellular network.

10. A wireless communication node for use in a wireless communication system comprising:
    a smart antenna configured to generate a plurality of directional beams;
    a memory configured to store a list of neighbor nodes and beam configuration information to be used in transmission of messages to the neighbor nodes; and
    a controller configured to:
        update the list stored in the memory by monitoring signals received from the neighbor nodes and determining optimum beam and signal configurations for transmitting data to the neighbor nodes and
        independently select a particular directional beam for transmitting a particular message to another node using the updated list stored in the memory for establishing a backhaul network.

11. The wireless communication node of claim 10 further comprising a wired backhaul connection to a core network.

12. The wireless communication node of claim 11 wherein the node is configured to receive and transmit backhaul information to another node with a wireless backhaul connection while the node receives and transmits backhaul information to the core network.

13. The wireless communication node of claim 10 further comprising a wired backhaul connection to at least one other node.

14. The wireless communication node of claim 10 wherein the generated plurality of directional beams are selected from a set of predetermined positions.

15. The wireless communication node of claim 10 wherein the generated plurality of directional beams are dynamically selected and directed in real time.

16. The wireless communication node of claim 15 wherein the directional beams are selected to provide the best performance in terms of system capacity, data throughput, and interference.

17. The wireless communication node of claim 10 wherein the node is configured to transmit backhaul information over the wired backhaul connection.

18. The wireless communication node of claim 10 configured for use in a wireless mesh network.

19. The wireless communication node of claim 10 configured for use in a cellular network.

* * * * *